US 8,736,094 B2

(12) United States Patent
Wakasa et al.

(10) Patent No.: US 8,736,094 B2
(45) Date of Patent: May 27, 2014

(54) WIND-TURBINE-GENERATOR CONTROL SYSTEM, WIND TURBINE GENERATOR, WIND FARM, AND WIND-TURBINE-GENERATOR CONTROL METHOD

(71) Applicant: Mitsubishi Heavy Industries, Ltd., Tokyo (JP)

(72) Inventors: Tsuyoshi Wakasa, Tokyo (JP); Akira Yasugi, Tokyo (JP); Yoshikatsu Ikawa, Tokyo (JP); Takehiro Naka, Tokyo (JP); Hisanobu Shinoda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/752,888

(22) Filed: Jan. 29, 2013

(65) Prior Publication Data

US 2013/0187385 A1    Jul. 25, 2013

Related U.S. Application Data

(63) Continuation-in-part of application No. PCT/JP2012/080341, filed on Nov. 22, 2012.

(30) Foreign Application Priority Data

Jan. 20, 2012   (JP) .................................. 2012-010024

(51) Int. Cl.
*F03D 9/00*     (2006.01)
*H02P 9/04*     (2006.01)

(52) U.S. Cl.
USPC ............................................. 290/44; 290/55

(58) Field of Classification Search
USPC .................................................... 290/44, 55
See application file for complete search history.

(56) References Cited

U.S. PATENT DOCUMENTS 4,994,684 A * 2/1991 Lauw et al. ..................... 290/52
5,798,631 A * 8/1998 Spee et al. ..................... 322/25

(Continued)

FOREIGN PATENT DOCUMENTS

| JP | 2003535561 A | 11/2003 |
| JP | 200789399 A  | 4/2007  |
| JP | 201138406 A  | 2/2011  |

OTHER PUBLICATIONS

Written Opinion of the International Searching Authority mailed May 3, 2013 (Japanese Language Version).

(Continued)

*Primary Examiner* — Pedro J Cuevas
(74) *Attorney, Agent, or Firm* — Lowe Hauptman & Ham LLP

(57) ABSTRACT

A turbine controller of a wind turbine generator includes a generated-output-power command value creating section that creates a generated-output-power command value and an optimum-upper-and-lower-limit limiting section that limits the generated-output-power command value by means of an upper limit value and a lower limit value of the generated output power that are determined based on a power curve indicating the relationship between the generated output power and the rotational speed of the generator. Furthermore, the turbine controller includes a limit-value creating section that creates, when the grid frequency is increased above a predetermined reference frequency, a frequency-dependent limit value serving as an upper limit value of the generated-output-power command value, according to the increase in grid frequency; and a first upper-limit limiting section that limits the upper limit value of the generated-output-power command value limited by the optimum-upper-and-lower-limit limiting section, by means of the frequency-dependent limit value.

8 Claims, 7 Drawing Sheets

(56) References Cited

U.S. PATENT DOCUMENTS

| | | | |
|---|---|---|---|
| 6,891,281 B2 | 5/2005 | Wobben | 290/44 |
| 7,880,321 B2* | 2/2011 | Arinaga et al. | 290/44 |
| 7,982,325 B2 | 7/2011 | Andersen | 290/44 |
| 8,026,623 B2* | 9/2011 | Wakasa et al. | 290/44 |
| 8,053,917 B2* | 11/2011 | Wakasa et al. | 290/44 |
| 8,338,978 B2* | 12/2012 | Yasugi et al. | 290/44 |
| 8,598,726 B1* | 12/2013 | Yasugi et al. | 290/44 |
| 2008/0179887 A1* | 7/2008 | Kawazoe et al. | 290/44 |
| 2010/0237618 A1* | 9/2010 | Arinaga et al. | 290/44 |
| 2011/0001318 A1 | 1/2011 | Nelson | 290/44 |
| 2011/0037262 A1 | 2/2011 | Krueger | 290/44 |
| 2011/0089693 A1* | 4/2011 | Nasiri | 290/44 |
| 2011/0182712 A1* | 7/2011 | Nayebi et al. | 415/15 |
| 2011/0227343 A1* | 9/2011 | Yasugi et al. | 290/44 |
| 2012/0133132 A1* | 5/2012 | Yasugi | 290/44 |
| 2012/0205912 A1* | 8/2012 | Wakasa et al. | 290/44 |
| 2013/0009611 A1* | 1/2013 | Tripathi et al. | 322/23 |
| 2013/0140820 A1* | 6/2013 | Tarnowski | 290/44 |

OTHER PUBLICATIONS

Written Opinion of the International Searching Authority mailed May 3, 2013 (English Language Version).

* cited by examiner

WIND-TURBINE-GENERATOR CONTROL SYSTEM, WIND TURBINE GENERATOR, WIND FARM, AND WIND-TURBINE-GENERATOR CONTROL METHOD

CROSS REFERENCE TO RELATED APPLICATIONS

This is a continuation of International Application PCT/JP2012/80341, with an international filing date of Nov. 22, 2012, which is hereby incorporated by reference herein in its entirety.

TECHNICAL FIELD

The present invention relates to a wind-turbine-generator control system, a wind turbine generator, a wind farm, and a wind-turbine-generator control method.

BACKGROUND ART

A wind turbine generator, which transmits generated electrical power to a utility grid, is required to perform PFR (primary frequency control) for controlling the generated output power so as to stabilize the grid frequency, which is the frequency of the utility grid, in order to maintain the quality of electrical power and stabilize the utility grid. Thus, when the grid frequency is increased, the wind turbine generator needs to reduce active power to be output.

Table 1 shows example requirements (interconnection requirements (grid code)) of the wind turbine generator in response to a change in grid frequency.

TABLE 1

| GRID FREQUENCY | REQUIREMENTS |
|---|---|
| >47.5 Hz | DISCONNECTION |
| ≥47.5 Hz <50.2 Hz | NO LIMIT, CONTINUE NORMAL OPERATION |
| ≥50.2 Hz <51.5 Hz | LIMIT GENERATED OUTPUT POWER ACCORDING TO FOLLOWING LIMITING EQUATION $$\Delta P = 20 P_M \frac{50.2 - f_{grid}}{50.0}$$ $P_M$: ACTIVE POWER THAT CAN BE CURRENTLY OUTPUT [MW] $\Delta P$: AMOUNT OF LIMITATION ON GENERATED OUTPUT POWER [MW] $f_{grid}$: GRID FREQUENCY [Hz] |
| ≥51.5 Hz | DISCONNECTION |

Note
that, as indicated by the limiting equation shown in Table 1, the amount of limitation on the generated output power is determined according to the difference between an actual grid frequency and a reference grid frequency (50.2 Hz in the example shown in Table 1).

If the wind turbine generator cannot satisfy the interconnection requirements, the wind turbine generator may not be allowed to interconnect to the utility grid.

PTL 1 describes a wind-turbine-generator control method for reducing the output power of a generator according to an increase in grid frequency. In the control method described in PTL 1, when the grid frequency is increased, the grid frequency is set as the control target, and the output power of a wind turbine generator is reduced so as to reduce the grid frequency.

CITATION LIST

Patent Literature

{PTL 1} U.S. Pat. No. 6,891,281

SUMMARY OF INVENTION

Technical Problem

However, reducing the generated output power of the wind turbine generator leads to a reduction in income from selling electricity, which is not desirable for the owner of the wind turbine generator (electricity selling utility).

The present invention has been made in view of such circumstances, and an object thereof is to provide a wind-turbine-generator control system, a wind turbine generator, a wind farm, and a wind-turbine-generator control method capable of satisfying the interconnection requirements and, even when the grid frequency is increased, capable of obtaining the same generated output power as that obtained when the grid frequency is not increased.

Solution to Problem

In order to solve the above-described problem, the wind-turbine-generator control system, the wind turbine generator, the wind farm, and the wind-turbine-generator control method of the present invention employ the following solutions.

Specifically, according to a first aspect, the present invention provides a wind-turbine-generator control system for a wind turbine generator that is interconnected to a utility grid and that generates power with a generator through rotation of a rotor having blades, including: output-power a command value creating unit for creating an output-power command value indicating a generated output power of the wind turbine generator; a output-power command value limiting unit for limiting the output-power command value by means of at least an upper limit value of the generated output power, the upper limit value being determined based on a relationship between the generated output power and the rotational speed of the generator; a limit-value creating unit for creating, when a grid frequency, which is a frequency of the utility grid, is increased above a predetermined reference frequency, a first limit value serving as an upper limit value of the output-power command value, according to the increase in the grid frequency; and a first upper-limit limiting unit for limiting the upper limit value of the output-power command value limited by the output-power command value limiting unit, by means of the first limit value created by the limit-value creating unit.

According to this configuration, the wind turbine generator is interconnected to the utility grid and generates power with the generator through rotation of the rotor having the blades.

In the wind-turbine-generator control system, the output-power command value creating unit creates the output-power command value indicating the generated output power of the wind turbine generator. The output-power command value is limited by the output-power command value limiting unit by means of at least the upper limit value of the generated output power, the upper limit value being determined based on the relationship between the generated output power and the rotational speed of the generator (a so-called power curve). The rotational speed of the generator in the power curve is the optimum value at which the output power is most efficiently generated, and the power curve is determined in advance based on the characteristics etc. of the blades. Thus, the generated-output-power command value is limited with the rotational speed of the generator serving as the control target. Note that the output-power command value limiting unit may limit the output-power command value by means of an upper limit value and a lower limit value of the generated output power that are determined based on the power curve.

When the grid frequency is increased above the predetermined reference frequency, the limit-value creating unit creates the first limit value serving as an upper limit value of the output-power command value according to the increase in grid frequency. The upper limit value of the output-power command value limited by the output-power command value limiting unit is limited by the first upper-limit limiting unit by means of the first limit value.

In conventional technologies, when the grid frequency is increased, the grid frequency is the control target, and the output power of the wind turbine generator is reduced so as to reduce the grid frequency.

On the other hand, in this configuration, even in order to reduce the grid frequency, the output-power command value is limited in advance by means of the upper limit value and the lower limit value, which are determined based on the relationship between the generated output power and the rotational speed of the generator. Therefore, the rotational speed of the generator is the control target, unlike the conventional technologies in which the grid frequency is the control target.

In this way, in this configuration, even when the grid frequency is increased, the wind turbine generator is controlled with the rotational speed of the generator serving as the control target, as in the case where the grid frequency is not increased; therefore, it is possible to satisfy the interconnection requirements and, even when the grid frequency is increased, to obtain the same generated output power as that obtained when the grid frequency is not increased.

In the above-described first aspect, it is preferable that a second upper-limit limiting unit for limiting the upper limit value of the output-power command value limited by the output-power command value limiting unit, by means of a second limit value that can be arbitrarily set, be further included, in which the first upper-limit limiting unit limits the upper limit value of the output-power command value limited by the second upper-limit limiting unit, by means of the first limit value.

According to this configuration, the upper limit value of the output-power command value is limited by the first upper-limit limiting unit and the second upper-limit limiting unit; therefore, when the grid frequency is increased, a plurality of types of compensation control (PFR and SFR) can be easily performed.

In the above-described first aspect, it is preferable that the limit-value creating unit creates the first limit value by multiplying a reduction in the generated output power corresponding to the increase in the grid frequency by a reference output power.

The reference output power is the generated output power that can be output if limitation on the generated output power associated with an increase in grid frequency is not performed. With this configuration, an appropriate first limit value can be easily generated.

In the above-described first aspect, it is preferable that the reference output power be the generated output power that is output before the grid frequency is increased or the generated output power that is output based on wind speed at the wind turbine generator.

The generated output power that is output before the grid frequency is increased is the electrical power that can be currently output according to the past performance, and the generated output power that is output based on the wind speed is the electrical power that can be currently output according to the current wind speed, which changes from moment to moment. Thus, with this configuration, the first limit value can be calculated accurately.

In the above-described first aspect, it is preferable that, if the wind turbine generator will be stopped after the first upper-limit limiting unit limits the output-power command value, the first upper-limit limiting unit does not limit the output-power command value.

When the output-power command value is limited, the generated output power of the wind turbine generator is reduced, and thus the rotor increases the rotational speed thereof. When the rotational speed of the rotor reaches a predetermined threshold, the wind turbine generator is tripped in order to protect the wind turbine generator. The generator is disconnected at the time of tripping; however, when it is disconnected, electrical power that had been supplied to the utility grid is stopped, thus causing an adverse effect on the utility grid, such as a reduction in the grid frequency. Furthermore, once the wind turbine generator is tripped, it takes time to restart it. Furthermore, it is not desirable to frequently repeat stopping and restarting in terms of the lifetimes of various devices, such as the main body of the wind turbine generator and a breaker for breaking the connection to the utility grid.

Therefore, in this configuration, when the wind turbine generator will be stopped after the first upper-limit limiting unit limits the generated-output-power command value, the first upper-limit limiting unit does not limit the output-power command value. Thus, the wind turbine generator can be prevented from being disconnected, stopped, and restarted, repeatedly.

According to a second aspect, the present invention provides a wind turbine generator including the above-described wind-turbine-generator control system.

According to a third aspect, the present invention provides a wind farm including a plurality of the wind turbine generators described above.

According to a fourth aspect, the present invention provides a wind-turbine-generator control method for a wind turbine generator that is interconnected to a utility grid and that generates power with a generator through rotation of a rotor having blades, the control method including: creating an output-power command value indicating a generated output power of the wind turbine generator; limiting the output-power command value by means of at least an upper limit value of the generated output power, the upper limit value being determined based on a relationship between the generated output power and the rotational speed of the generator; creating, when a grid frequency, which is a frequency of the utility grid, is increased above a predetermined reference frequency, a first limit value serving as an upper limit value of the output-power command value, according to the increase in the grid frequency; and limiting the upper limit value of the output-power command value limited by means of the first limit value.

Advantageous Effects of Invention

According to the present invention, an advantageous effect is afforded in that it is possible to satisfy the interconnection requirements and, even when the grid frequency is increased, to obtain the same generated output power as that obtained when the grid frequency is not increased.

BRIEF DESCRIPTION OF DRAWINGS

FIG. 5(a) shows the timing at which the grid frequency is increased, FIG. 5(b) shows temporal changes in the reduction in generated output power, and FIG. 5(c) shows temporal changes in the generated output power.

DESCRIPTION OF EMBODIMENTS

A wind-turbine-generator control system, a wind turbine generator, a wind farm, and a wind-turbine-generator control method according to an embodiment of the present invention will be described below with reference to the drawings.

First Embodiment

A first embodiment of the present invention will be described below.

The embodiment of the present invention will be described below.

Figure 1:
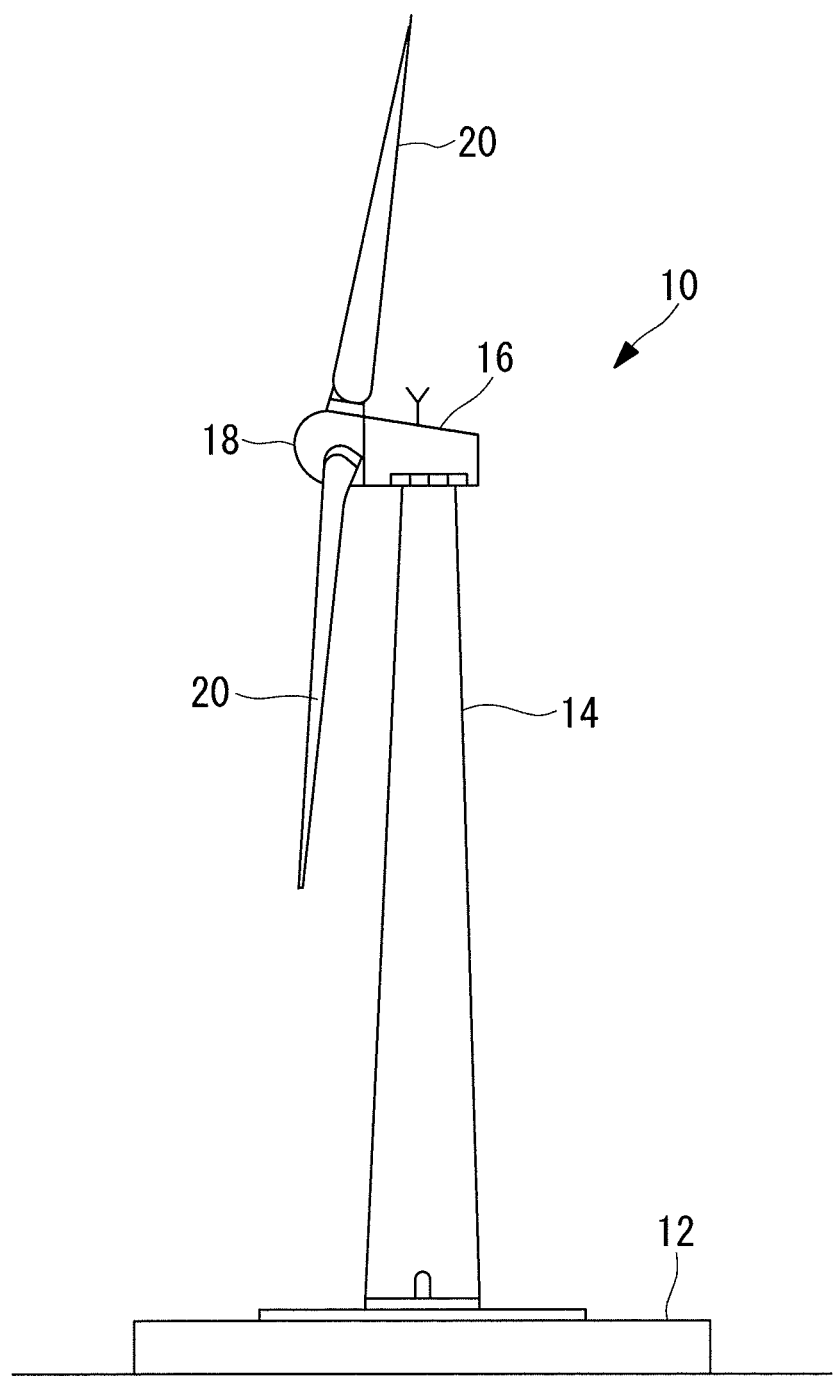
FIG. 1 is an external view of a wind turbine generator according to a first embodiment of the present invention.

FIG. 1 is an external view of a wind turbine generator 10 according to this embodiment.

The wind turbine generator 10 shown in FIG. 1 includes a tower (supporting column) 14 that is provided upright on a foundation 12, a nacelle 16 that is provided on the top of the tower 14, and a rotor 18 that is provided on the nacelle 16 so as to be capable of rotating about a substantially horizontal axis.

A plurality of (for example, three in this embodiment) blades 20 are attached to the rotor 18 in a radiating pattern from the rotational axis of the rotor 18. With this structure, the force of wind striking the blades 20 from the direction of the rotational axis of the rotor 18 is converted to mechanical power causing the rotor 18 to rotate about the rotational axis, and the mechanical power is converted to electrical power by a generator. Note that the blades 20 are coupled to the rotor 18 so as to be capable of rotating with respect to the wind direction, and the pitch angles of the blades 20 can be changed.

Figure 2:
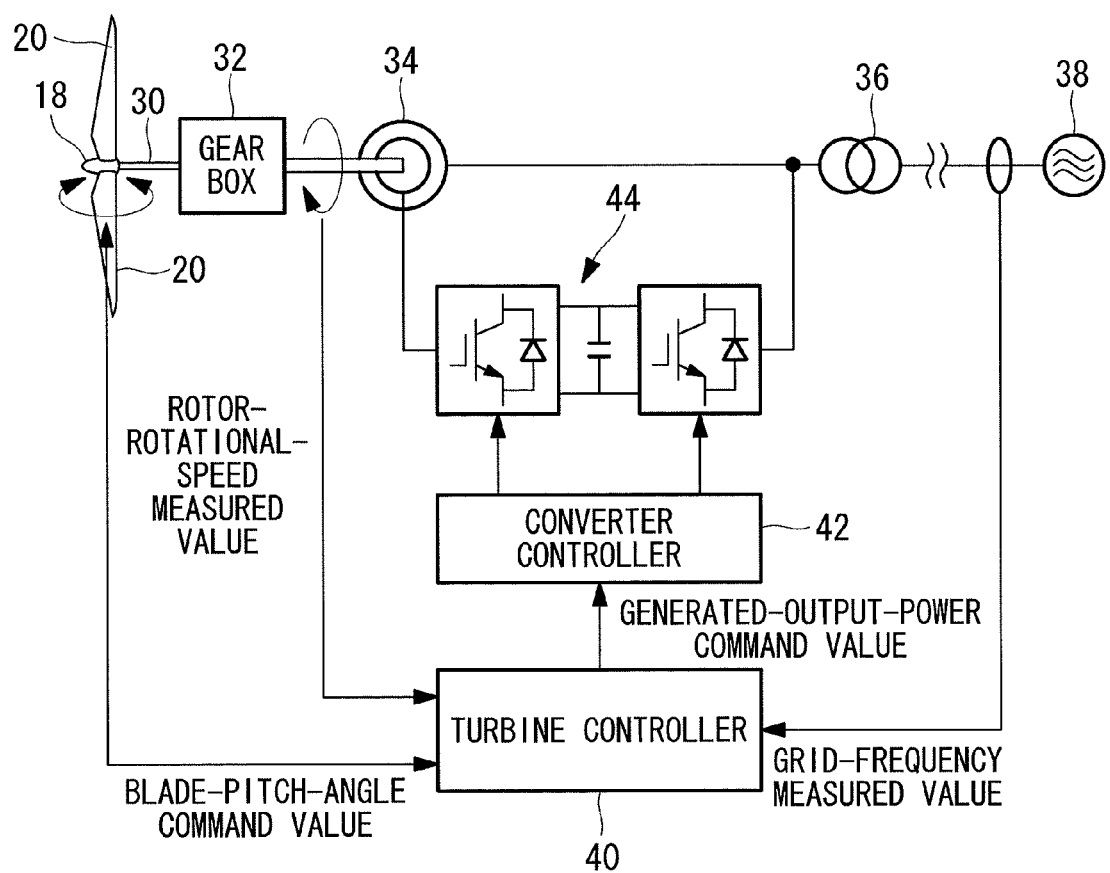
FIG. 2 is a diagram schematically showing the electrical configuration of the wind turbine generator according to the first embodiment of the present invention.

FIG. 2 is a diagram schematically showing the electrical configuration of the wind turbine generator 10 of the first embodiment.

In the wind turbine generator 10, mechanical power is transferred to a generator 34 via a gear box 32 that increases the rotational speed of a main shaft 30 connected to the rotor 18 and is converted to electrical power by the generator 34. Note that the generator 34 is a wound-type induction generator, for example, but may be a synchronous generator. The wind turbine generator 10 is interconnected to a utility grid 38 via a transformer 36 for boosting the voltage for supplying the electrical power to the utility grid 38.

Note that the wind turbine generator 10 of the first embodiment is required to perform PFR to control the generated output power so as to stabilize the grid frequency, which is the frequency of the utility grid 38.

The wind turbine generator 10 is controlled by a turbine controller 40 provided in the nacelle 16. The turbine controller 40 creates a blade-pitch-angle command value indicating the pitch angles of the blades 20, based on the measured value of the rotational speed of the rotor 18 (hereinafter, referred to as "rotor-rotational-speed measured value") and outputs it to a pitch actuator (not shown) that changes the pitch angles.

Furthermore, the turbine controller 40 creates a generated-output-power command value indicating the magnitudes of active power and reactive power to be output by the wind turbine generator 10, based on the rotor-rotational-speed measured value and the measured value of the grid frequency (hereinafter, referred to as "grid-frequency measured value") and outputs it to a converter controller 42.

The converter controller 42 creates a control signal for controlling a converter 44 provided in the wind turbine generator 10, based on the received generated-output-power command value. The converter 44 controls the generated output power to be supplied from the generator 34 to the utility grid 38, based on the control signal received from the converter controller 42.

Figure 3:
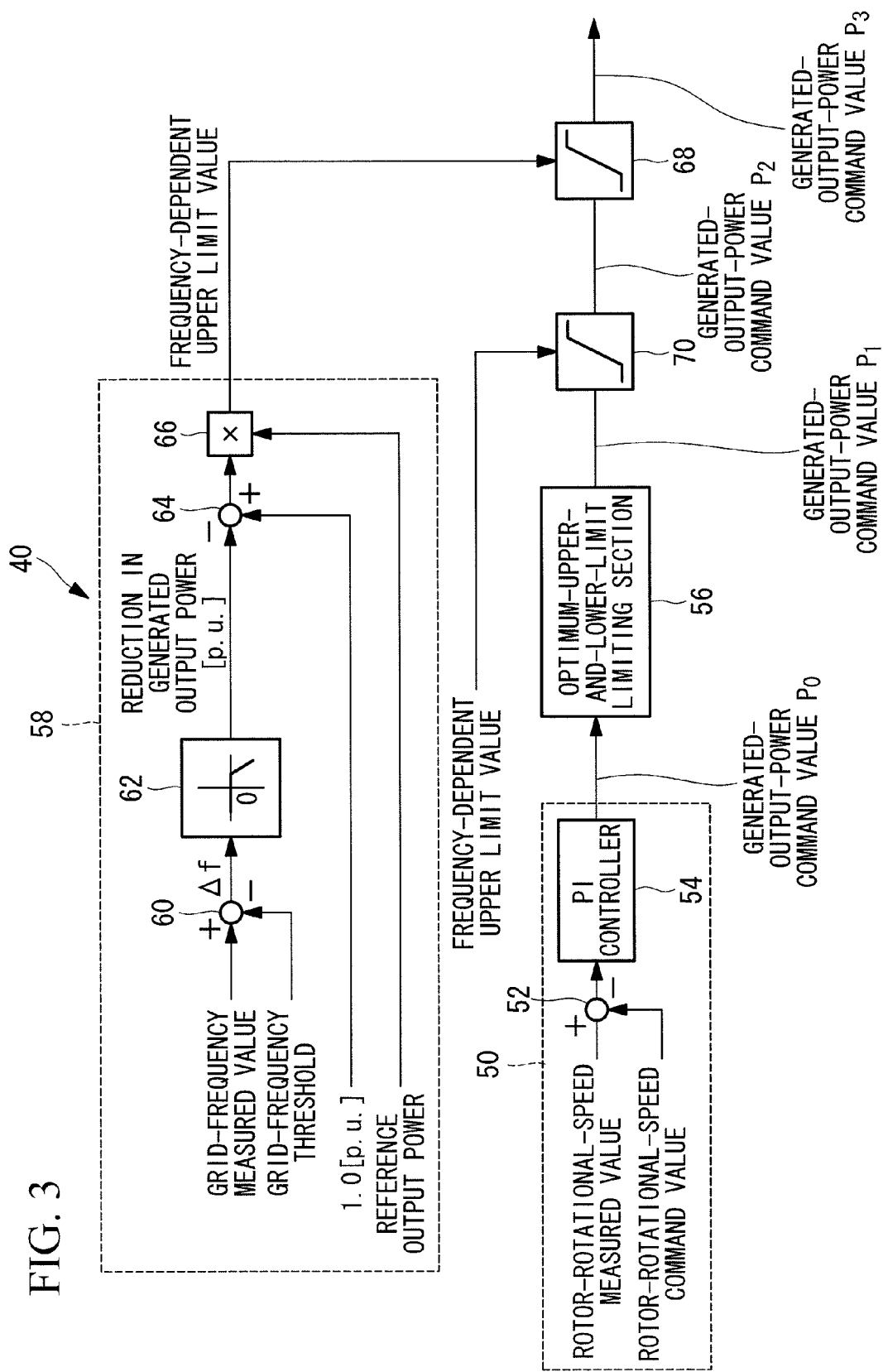
FIG. 3 is a functional block diagram showing a function for creating a generated-output-power command value, in a turbine controller according to the first embodiment of the present invention.

FIG. 3 is a functional block diagram showing a function of the turbine controller 40 for creating the generated-output-power command value.

In the turbine controller 40, the generated-output-power command value is created by a generated-output-power command value creating section 50. In the generated-output-power command value creating section 50 of the first embodiment, the difference between the rotor-rotational-speed measured value and a command value for the rotational speed of the rotor 18 (hereinafter, referred to as "rotor-rotational-speed command value") is calculated by a subtractor 52, and a generated-output-power command value $P_0$ is created through PI control performed by a PI controller 54 based on this difference. Note that the generated-output-power command value creating section 50 may create the generated-output-power command value $P_0$ based on the rotational speed of the generator 34, instead of the rotational speed of the rotor 18.

The generated-output-power command value $P_0$ created by the generated-output-power command value creating section 50 is input to an optimum-upper-and-lower-limit limiting section 56.

The optimum-upper-and-lower-limit limiting section 56 limits the generated-output-power command value $P_0$ by means of an upper limit value and a lower limit value of the generated output power, which are determined to cause the generator 34 to efficiently rotate (thus outputting a generated-output-power command value $P_1$).

Thus, when it is impossible for the generated output power to reach the rated value because the force of incoming wind is weak, the wind turbine generator 10 can bring the rotational speed of the rotor 18 close to a target value to efficiently generate power.

Furthermore, the turbine controller 40 includes a limit-value creating section 58. When the grid frequency is increased above a predetermined reference frequency, the limit-value creating section 58 creates a limit value that serves as an upper limit value of the generated-output-power command value (hereinafter, referred to as "frequency-dependent upper limit value"), according to the increase in grid frequency.

In the limit-value creating section 58, a subtractor 60 calculates the difference between the grid-frequency measured value and a grid frequency threshold that is a predetermined reference value of the grid frequency.

If the output from the subtractor 60 is positive, the grid-frequency measured value is larger than the grid frequency threshold, which is the timing at which PFR is performed. In this case, a reduction calculating section 62 of the limit-value creating section 58 calculates a reduction in generated output power corresponding to the increase in grid frequency (hereinafter, referred to as "reduction in generated output power") based on the difference. Note that the reduction calculating section 62 of the first embodiment calculates the reduction in generated output power, in pu units, for example.

Then, in the limit-value creating section 58, a subtractor 64 calculates the difference between the reduction in generated output power [p.u.] calculated by the reduction calculating section 62 and a reference value of 1.0 [p.u.], and a multiplier 66 multiplies the calculated result by a reference generated output power (hereinafter, referred to as "reference output power") [kW]. As a result, a frequency-dependent upper limit value [kW] that serves as an upper limit value of the generated output power when the grid frequency is increased above the reference value is calculated.

The frequency-dependent upper limit value created by the limit-value creating section 58 is input to a first upper-limit limiting section 68.

Furthermore, the turbine controller 40 includes a second upper-limit limiting section 70 that limits the upper limit value of the generated-output-power command value $P_1$, output after the limitation performed by the optimum-upper-and-lower-limit limiting section 56, by means of a limit value that can be arbitrarily set (hereinafter, referred to as "arbitrarily-set upper limit value") (thus outputting a generated-output-power command value $P_2$).

The arbitrarily-set upper limit value is set by a manager of the utility grid 38 or an administrator of the wind turbine generator 10, for example, so as to be able to acquire an appropriate income from selling electricity.

The generated-output-power command value $P_2$, output after the limitation performed by the second upper-limit limiting section 70, is limited by the first upper-limit limiting section 68 by means of the frequency-dependent upper limit value (thus outputting a generated-output-power command value $P_3$), and the generated-output-power command value $P_3$ is output to the converter controller 42.

Next, the operation of the turbine controller 40 of the first embodiment will be described.

Figure 4:
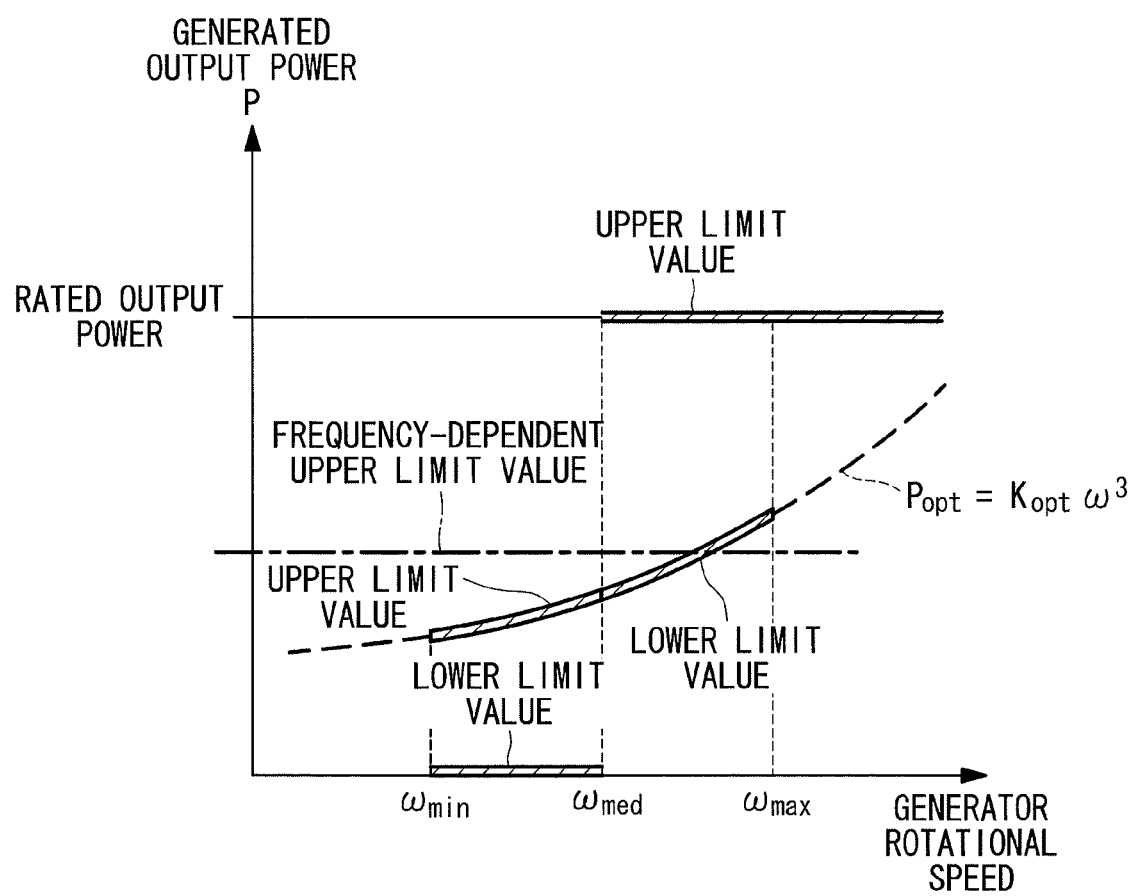
FIG. 4 is a graph showing the relationship between a power curve of the wind turbine generator according to the first embodiment of the present invention and limit values of the generated output power.

FIG. 4 is a graph showing the relationship between a power curve of the wind turbine generator 10 and limit values of the generated output power. The power curve is a curve showing the relationship between the generated output power and the rotational speed of the generator 34 and is expressed by Equation (1) in which P indicates the generated-output-power command value, ω indicates the rotational speed of the generator 34, and Kopt indicates a coefficient. The rotational speed of the generator 34 in the power curve is the optimum value at which the output power is most efficiently generated, and the power curve is determined in advance based on the characteristics etc. of the blades 20.

$$P = Kopt \times \omega^3 \quad (1)$$

The turbine controller 40 of the first embodiment calculates the optimum rotational speed ω of the generator 34 based on the generated-output-power command value P and Equation (1) and changes the pitch angles of the blades 20 so as to obtain the calculated rotational speed ω, thus controlling the rotational speed of the rotor 18, that is, the rotational speed of the generator 34.

Then, the optimum-upper-and-lower-limit limiting section 56, which limits the generated-output-power command value $P_0$, sets the generated output power indicated by the power curve as the upper limit value of the generated-output-power command value P and sets the generated output power of 0 [kW] as the lower limit value of the generated-output-power command value P, in the range from a minimum value $\omega_{min}$ to an intermediate value $\omega_{med}$ that are specified for the rotational speed ω in advance. Furthermore, the optimum-upper-and-lower-limit limiting section 56 sets the generated output power indicated by the power curve as the lower limit value of the generated-output-power command value P and sets the rated power as the upper limit value of the generated-output-power command value P, in the range from the intermediate value $\omega_{med}$ to a maximum value $\omega_{max}$ that are specified for the rotational speed ω in advance. Then, the optimum-upper-and-lower-limit limiting section 56 limits the generated-output-power command value P so as to be changed along the power curve. Specifically, the wind turbine generator 10 is controlled with the rotational speed of the generator 34 serving as the control target.

Then, when the grid frequency is increased above the predetermined reference frequency, the wind turbine generator 10 of the first embodiment creates a frequency-dependent limit value serving as the upper limit value of the generated-output-power command value, according to the increase in grid frequency, and limits the upper limit value of the generated-output-power command value limited by the optimum-upper-and-lower-limit limiting section 56 by means of the frequency-dependent limit value.

In conventional technologies, when the grid frequency is increased, the grid frequency is the control target, and the output power of the wind turbine generator 10 is reduced so as to reduce the grid frequency.

On the other hand, in the wind turbine generator 10 of the first embodiment, even in order to reduce the grid frequency, the generated-output-power command value is limited by means of the upper limit value and the lower limit value, which are determined based on the generated output power and the power curve. Therefore, the rotational speed of the generator 34 is the control target, unlike the conventional technologies in which the grid frequency is the control target.

In this way, even when the grid frequency is increased, the wind turbine generator 10 of the first embodiment is controlled with the rotational speed of the generator 34 serving as the control target, as in the case where the grid frequency is not increased; therefore, it is possible to satisfy the interconnection requirements and, even when the grid frequency is increased, to obtain the same generated output power as that obtained when the grid frequency is not increased.

Furthermore, the turbine controller 40 creates the frequency-dependent limit value by multiplying the reduction in generated output power by the reference output power. The reference output power corresponds to the generated output power that can be output if the limitation on the generated output power associated with an increase in grid frequency is not performed, and the reference output power is synonymous with "$P_M$: active power that can be currently output" shown in Table 1.

With this calculation method, the turbine controller 40 can easily create an appropriate frequency-dependent limit value.

Here, the specific reference output power is the generated output power that is output before the grid frequency is increased or the generated output power that is output based on the wind speed at the wind turbine generator 10. The generated output power that is output before the grid frequency is increased is the electrical power that can be currently output according to the past performance, and the generated output power that is output based on the wind speed is the electrical power that can be currently output according to the current wind speed, which changes from moment to moment. Thus, the turbine controller 40 can accurately calculate the frequency-dependent limit value.

The reference output power will be described with reference to FIG. 5.

Figure 5:
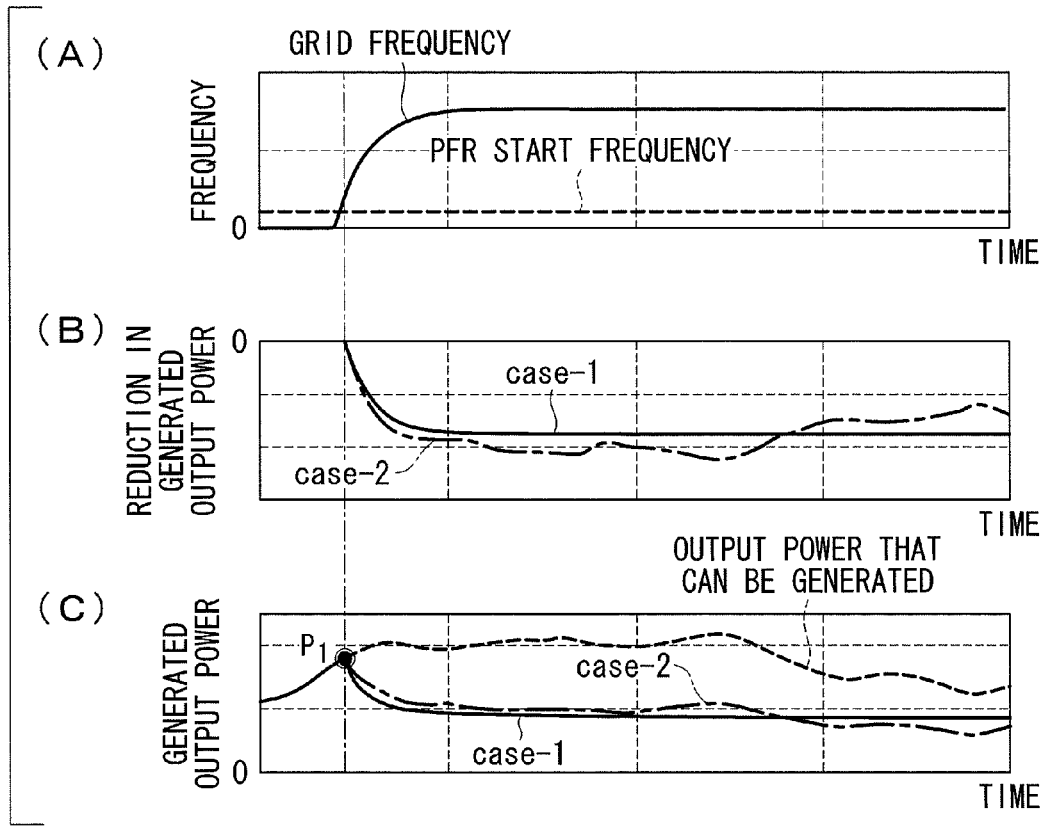
FIG. 5 is a graph showing the relationship between generated output power and a change in grid frequency, according to the first embodiment of the present invention.

FIG. 5 includes graphs showing the relationship between the generated output power and the change in grid frequency. FIG. 5(a) shows the timing at which the grid frequency is increased. FIG. 5(b) shows temporal changes in the reduction in generated output power. FIG. 5(c) shows temporal changes in the generated output power, where the dashed line indicates the generated output power that can be output if the limitation on the generated output power associated with an increase in grid frequency is not performed, and the generated output power changes from moment to moment under the influence of the wind speed.

The reduction in generated output power and the generated output power that are indicated by case-1 (solid line) in FIGS. 5(b) and 5(c), respectively, are obtained when the reference output power is set to the generated output power that is output before the grid frequency is increased (generated-output-power command value $P_1$). On the other hand, the reduction in generated output power and the generated output power that are indicated by case-2 (one-dot chain line) in FIGS. 5(b) and 5(c), respectively, are obtained when the reference output power is set to the generated output power that is output based on the wind speed at the wind turbine generator 10.

In the case where the reference output power is set to the generated output power that is output before the grid frequency is increased, it is only necessary to detect and store the generated output power that is output before the grid frequency is increased, thus requiring a simple configuration. On the other hand, in the case where the reference output power is set to the generated output power that is output based on the wind speed at the wind turbine generator 10, it is necessary to detect the wind speed, which changes from moment to moment, and to calculate the generated output power based on the detected wind speed, thus requiring a complicated configuration but obtaining a more accurate reference output power.

Furthermore, in the turbine controller 40 of the first embodiment, the generated-output-power command value is limited by the optimum-upper-and-lower-limit limiting section 56, is limited by the second upper-limit limiting section 70 by means of the arbitrarily-set upper limit value, and is then limited by the first upper-limit limiting section 68 by means of the frequency-dependent limit value.

Figure 6:
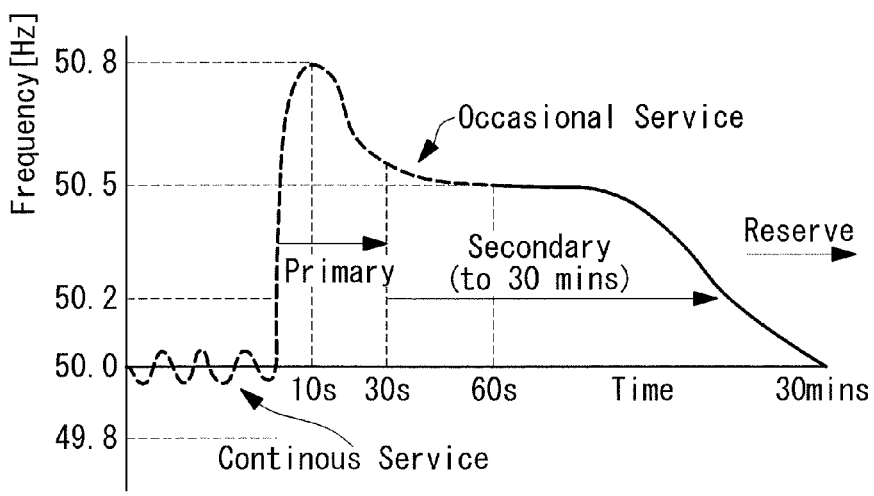
FIG. 6 is a graph showing the temporal changes from when the grid frequency is increased until the grid frequency is reduced to a reference frequency by limiting a generated-output-power command value.

FIG. 6 is an example graph showing the temporal changes from when the grid frequency is increased until the grid frequency is reduced to a reference frequency by limiting the generated-output-power command value.

In the case shown in FIG. 6, the increased grid frequency is reduced to a predetermined grid frequency (50.5 Hz in the example shown in FIG. 6) in a short period of time (for example, several tens of seconds) through PFR, which achieves a larger reduction in generated output power. Then, after the grid frequency is reduced to the above-mentioned predetermined grid frequency, SFR (secondary frequency response) is performed to gradually reduce the grid frequency to the reference frequency (50.0 Hz in the example shown in FIG. 6) over time (for example, 30 minutes). In this way, the frequency variation cycle is different between PFR and SFR.

In the turbine controller 40 of the first embodiment, the first upper-limit limiting section 68 handles PFR, and the second upper-limit limiting section 70 handles SFR. Since the increase in grid frequency with respect to the reference frequency is smaller when SFR is performed than when PFR is performed, the arbitrarily-set upper limit value is set higher than the frequency-dependent limit value.

Furthermore, the grid frequency threshold used in the limit-value creating section 58 is set to a value of the grid frequency at which PFR needs to be performed (50.5 Hz in the example shown in FIG. 6). Specifically, the first upper-limit limiting section 68 functions when the grid frequency is increased above the grid frequency threshold. On the other hand, the second upper-limit limiting section 70 functions, for example, when the grid frequency falls within the range from the grid frequency threshold to the reference frequency and when the manager of the utility grid determines that it is necessity to execute SFR and inputs, to the turbine controller 40, a signal to instruct the execution of SFR.

In this way, because the turbine controller 40 of the first embodiment includes the first upper-limit limiting section 68 and the second upper-limit limiting section 70, when the grid frequency is increased, different types of compensation control (PFR and SFR) can be easily performed for different frequency variation cycles.

As described above, the turbine controller 40 of the wind turbine generator 10 of the first embodiment includes the generated-output-power command value creating section 50, which creates the generated-output-power command value, and the optimum-upper-and-lower-limit limiting section 56, which limits the generated-output-power command value by means of the upper limit value and the lower limit value of the generated output power, which are determined based on the power curve. Furthermore, the turbine controller 40 includes the limit-value creating section 58, which creates the frequency-dependent limit value, serving as the upper limit value of the generated-output-power command value, based on an increase in grid frequency when the grid frequency is increased above the predetermined reference frequency, and the first upper-limit limiting section 68, which limits the upper limit value of the generated-output-power command value limited by the optimum-upper-and-lower-limit limiting section 56, by means of the frequency-dependent limit value.

Therefore, even when the grid frequency is increased, the turbine controller 40 controls the wind turbine generator 10 with the rotational speed of the generator 34 serving as the control target, as in the case where the grid frequency is not increased; therefore, it is possible to satisfy the interconnection requirements and, even when the grid frequency is increased, to obtain the same generated output power as that obtained when the grid frequency is not increased.

Second Embodiment

A second embodiment of the present invention will be described below.

Figure 7:
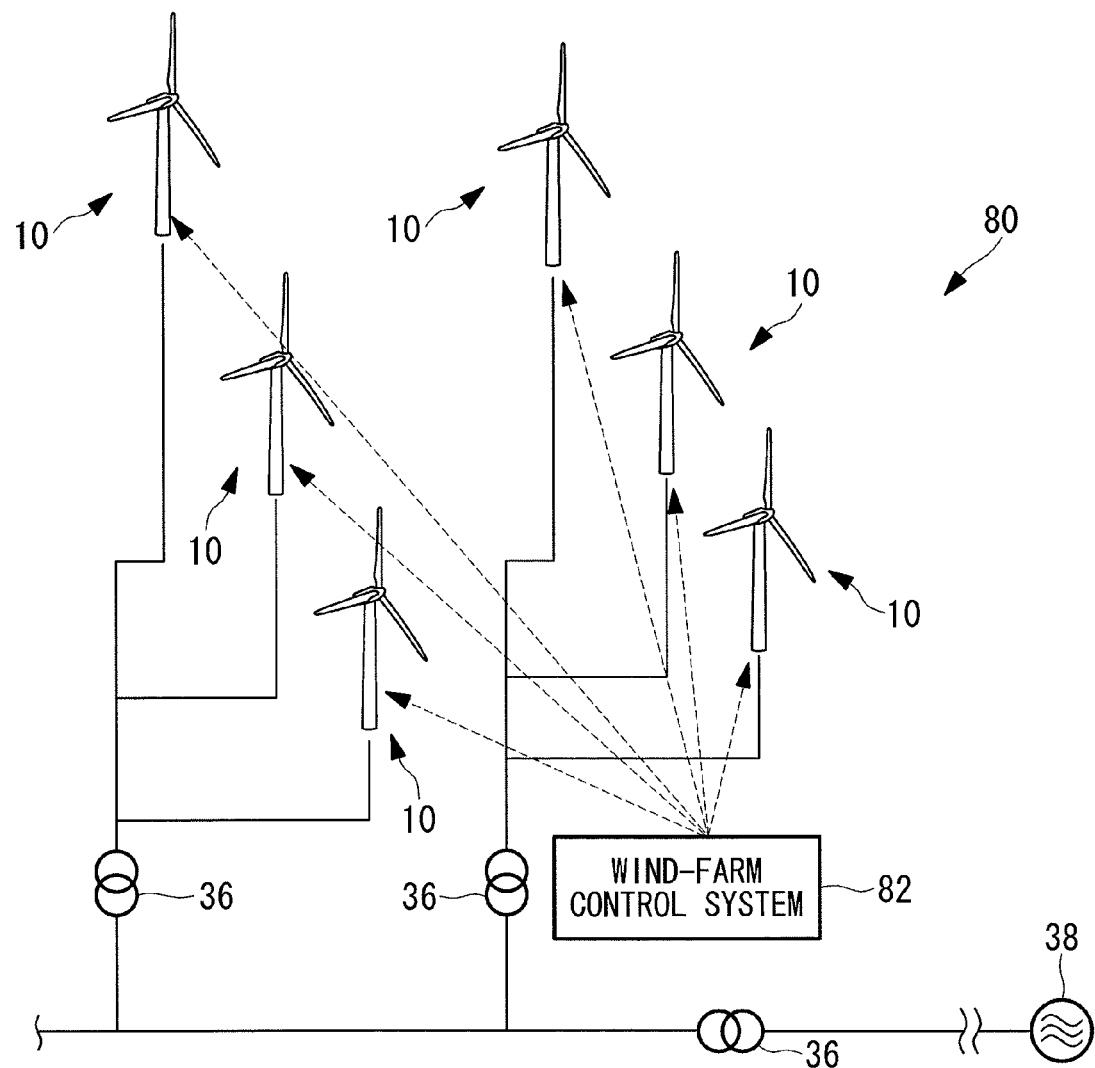
FIG. 7 is a view showing the configuration of a wind farm according to a second embodiment of the present invention.

FIG. 7 is a view showing the overall configuration of a wind farm 80 of the second embodiment.

The wind farm 80 includes a plurality of wind turbine generators 10 and a wind-farm control system 82 that receives, from each of the wind turbine generators 10, wind-turbine operating condition information indicating operating conditions of the wind turbine generator 10 (the wind direction, the wind speed, the rotational speed of the rotor 18, the generated output power, and the pitch angles of the blades 20) and that sends a control signal etc. to the wind turbine generator 10.

The wind-farm control system 82 is configured, for example, of a CPU (central processing unit), a RAM (random access memory), and a computer-readable storage medium, which are not shown.

Since the configuration of the wind turbine generators 10 of the second embodiment is the same as that of the wind turbine generator 10 of the first embodiment, shown in FIGS. 1 to 3, a description thereof will be omitted.

Here, when the generated-output-power command value is limited, the generated output power of the wind turbine generator 10 is reduced, and thus the rotor 18 increases the rotational speed thereof. When the rotational speed of the rotor 18 reaches a predetermined threshold, the wind turbine generator 10 is stopped (tripped) in order to protect the wind turbine generator 10. The generator 34 is disconnected at the time of tripping; however, when it is disconnected, electrical power that had been supplied to the utility grid 38 is stopped, thus causing an adverse effect on the utility grid 38, such as a reduction in the grid frequency. Furthermore, once the wind turbine generator 10 is tripped, it takes time to restart it. Furthermore, it is not desirable to frequently repeat stopping and restarting in terms of the lifetimes of various devices, such as the main body of the wind turbine generator 10 and a breaker for breaking the connection to the utility grid 38.

Therefore, in the wind turbine generator 10 of the second embodiment, if the wind turbine generator 10 will be tripped after the first upper-limit limiting section 68 limits the generated-output-power command value, the first upper-limit limiting section 68 does not limit the generated-output-power command value. Specifically, if the rotational speed of the rotor 18 will reach the predetermined threshold after PFR is performed, PFR is not performed. Thus, the wind turbine generator 10 can be prevented from being disconnected, stopped, and restarted, repeatedly.

In the second embodiment, the wind-farm control system 82 performs selection processing to select the wind turbine generator 10 for which PFR is not performed.

Figure 8:
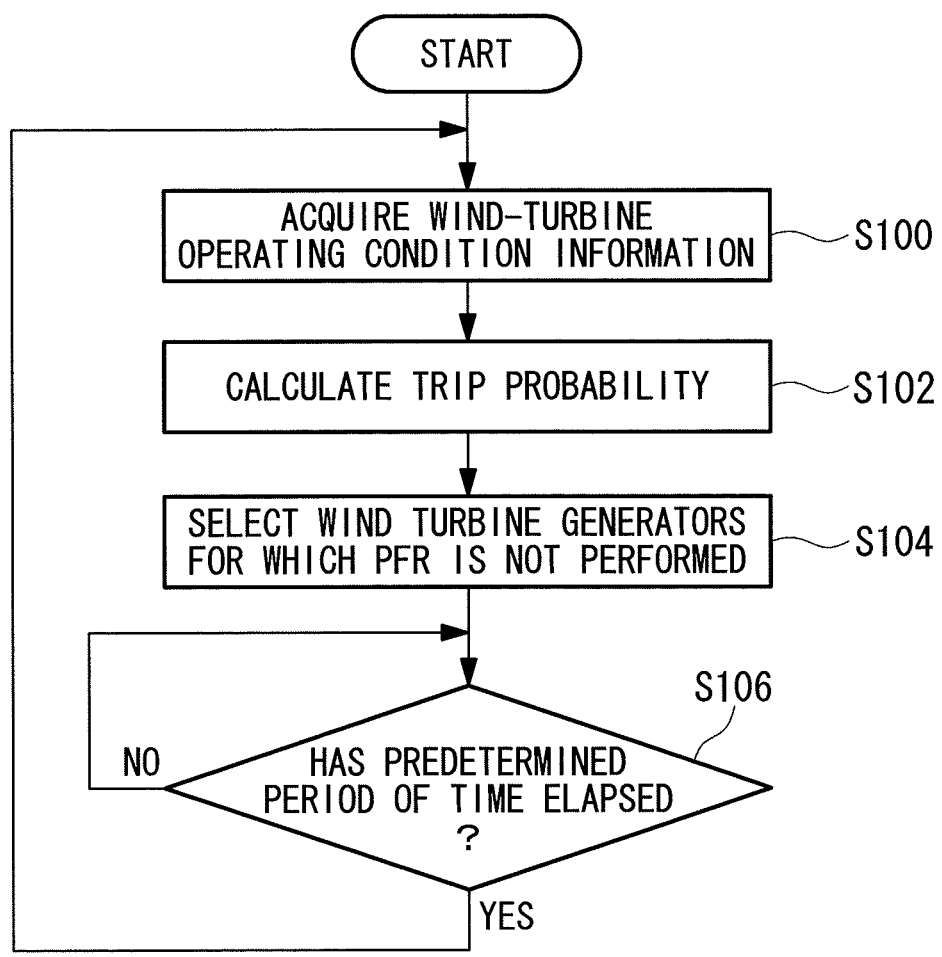
FIG. 8 is a flowchart showing the flow of selection processing according to the second embodiment of the present invention.

FIG. 8 is a flowchart showing the flow of processing of a program executed by the wind-farm control system 82 when the selection processing is performed. The program is stored in advance in a predetermined area of the storage medium of the wind-farm control system 82.

In Step 100, the wind-turbine operating condition information is acquired from each of the wind turbine generators 10 constituting the wind farm 80.

In the next Step 102, the behavior of each of the wind turbine generators 10 is input in a calculation model (for example, an equation of motion, an equation of state, or a look-up table) describing the behavior, and the probability that the wind turbine generator 10 will be tripped if PFR is performed (hereinafter, referred to as "trip probability") is calculated for each of the wind turbine generators 10. Note that the calculation model is stored in advance in the storage medium included in the wind-farm control system 82.

Table 2 shows the calculation results of the trip probabilities of the wind turbine generators 10.

TABLE 2

| WIND TURBINE GENERATOR | TRIP PROBABILITY (%) |
|---|---|
| No. 1 | 22 |
| No. 2 | 90 |
| No. 3 | 74 |
| No. 4 | 61 |
| NO. 5 | 51 |
| No. 6 | 80 |
| No. 7 | 88 |
| No. 8 | 15 |
| No. 9 | 35 |
| No. 10 | 54 |

In the next Step 104, the wind turbine generators 10 for which PFR is not performed are selected based on the trip probabilities of the wind turbine generators 10, calculated in Step 102. For example, the wind turbine generators 10 whose trip probability is equal to or greater than a predetermined value are selected as the wind turbine generators 10 for which PFR is not performed. For example, if the predetermined value is set to 80%, in the example shown in Table 2, the wind turbine generators 10 having Nos. 2, 6, and 7 are selected as the wind turbine generators 10 for which PFR is not performed.

Furthermore, the wind turbine generators 10 that fall in the top predetermined percentage of the trip probability may be selected as the wind turbine generators 10 for which PFR is not performed.

In the next Step 106, the processing flow is in a waiting state until a predetermined period of time (for example, ten minutes) elapses. After the elapse of the predetermined period of time, the processing flow returns to Step 100, and acquisition of the wind-turbine operating condition information, calculation of the trip probability, and selection of the wind turbine generators 10 for which PFR is not performed are repeated. Thus, it is possible deal with the execution of PFR, which occurs unexpectedly.

Note that, instead of the wind-farm control system 82, the turbine controller 40 provided in each wind turbine generator 10 or another calculator may calculate the trip probability. Furthermore, the turbine controller 40 or another calculator may select the wind turbine generators 10 for which PFR is not performed.

Furthermore, the wind-farm control system 82 may calculate, instead of the trip probability, a margin of the rotational speed of the rotor 18 with respect to the rotational speed at which the wind turbine generator 10 is tripped. In that case, PFR is not performed for the wind turbine generators 10 having a low margin of the rotational speed of the rotor 18.

The present invention has been described above by using the above-described embodiments; however, the technical scope of the present invention is not limited to the scope of the description of the above-described embodiments. Various modifications or improvements can be added to the above-described embodiments without departing from the gist of the invention, and configurations to which such modifications or improvements are added are also encompassed in the technical scope of the present invention.

For example, in the above-described embodiments, a description has been given of a configuration in which the turbine controller 40 includes the first upper-limit limiting section 68 and the second upper-limit limiting section 70;

however, the present invention is not limited thereto, and a configuration in which the turbine controller 40 includes the first upper-limit limiting section 68 but does not include the second upper-limit limiting section 70 is permissible. In this configuration, after being limited by the optimum-upper-and-lower-limit limiting section 56, the generated-output-power command value is limited by the first upper-limit limiting section 68 by means of the frequency-dependent limit value, without being limited by the second upper-limit limiting section 70 by means of the arbitrarily-set upper limit value.

REFERENCE SIGNS LIST

10 wind turbine generator
18 rotor
20 blades
34 generator
40 turbine controller
50 generated-output-power command value creating section
56 optimum-upper-and-lower-limit limiting section
58 limit-value creating section
68 first upper-limit limiting section
70 second upper-limit limiting section

The invention claimed is:

1. A wind-turbine-generator control system for a wind turbine generator that is interconnected to a utility grid and that generates power with a generator through rotation of a rotor having blades, comprising:
   a output-power command value creating unit for creating an output-power command value indicating a generated output power of the wind turbine generator;
   a output-power command value limiting unit for limiting the output-power command value by means of at least an upper limit value of the generated output power, the upper limit value being determined based on a relationship between the generated output power and the rotational speed of the generator;
   a limit-value creating unit for creating, when a grid frequency, which is a frequency of the utility grid, is increased above a predetermined reference frequency, a first limit value serving as an upper limit value of the output-power command value, according to the increase in the grid frequency; and
   a first upper-limit limiting unit for limiting the upper limit value of the output-power command value limited by the output-power command value limiting unit, by means of the first limit value created by the limit-value creating unit.

2. A wind-turbine-generator control system according to claim 1, further comprising a second upper-limit limiting unit for limiting the upper limit value of the output-power command value limited by the output-power command value limiting unit, by means of a second limit value that can be arbitrarily set,
   wherein the first upper-limit limiting unit limits the upper limit value of the output-power command value limited by the second upper-limit limiting unit, by means of the first limit value.

3. A wind-turbine-generator control system according to claim 1, wherein the limit-value creating unit creates the first limit value by multiplying a reduction in the generated output power corresponding to the increase in the grid frequency by a reference output power.

4. A wind-turbine-generator control system according to claim 3, wherein the reference output power is the generated output power that is output before the grid frequency is increased or the generated output power that is output based on wind speed at the wind turbine generator.

5. A wind-turbine-generator control system according to claim 1, wherein, if the wind turbine generator will be stopped after the first upper-limit limiting unit limits the output-power command value, the first upper-limit limiting unit does not limit the output-power command value.

6. A wind turbine generator comprising a wind-turbine-generator control system according to claim 1.

7. A wind farm comprising a plurality of wind turbine generators according to claim 6.

8. A wind-turbine-generator control method for a wind turbine generator that is interconnected to a utility grid and that generates power with a generator through rotation of a rotor having blades, the control method comprising:
   creating an output-power command value indicating a generated output power of the wind turbine generator;
   limiting the output-power command value by means of at least an upper limit value of the generated output power, the upper limit value being determined based on a relationship between the generated output power and the rotational speed of the generator;
   creating, when a grid frequency, which is a frequency of the utility grid, is increased above a predetermined reference frequency, a first limit value serving as an upper limit value of the output-power command value, according to the increase in the grid frequency; and
   limiting the upper limit value of the output-power command value limited by means of the first limit value.

\* \* \* \* \*